United States Patent [19]
Ito et al.

[11] Patent Number: 5,485,113
[45] Date of Patent: Jan. 16, 1996

[54] JITTER-COMPENSATED SAMPLING PHASE CONTROL APPARATUS

[75] Inventors: Tomokazu Ito; Akihiko Sugiyama, both of Tokyo, Japan

[73] Assignee: NEC Corporation, Japan

[21] Appl. No.: 365,197

[22] Filed: Dec. 28, 1994

[30] Foreign Application Priority Data

Dec. 28, 1993 [JP] Japan .................... 5-337684

[51] Int. Cl.[6] .................... H03H 11/16; H03H 11/26
[52] U.S. Cl. .................... 327/234; 327/244; 327/279; 327/292; 327/233
[58] Field of Search .................... 327/233, 9, 114, 327/234, 244, 292, 279

[56] References Cited

U.S. PATENT DOCUMENTS

| | | | |
|---|---|---|---|
| 4,145,704 | 3/1979 | Gallo | 358/8 |
| 4,616,252 | 10/1986 | Schiff | 358/23 |
| 5,399,984 | 3/1995 | Frank | 327/233 |

OTHER PUBLICATIONS

Y. Takahashi, et al. "An ISDN Echo–Cancelling Transceiver Chip Set for 2B1Q Coded U–Interface", IEEE Journal of Solid State Circuits, vol. 24, Dec. 1989.

T. Ito, et al. "A Fast Convergence Method for a Decision Feedback Equalizer Based on a Variable Step Phase Control", IEICE Journal B–572, pp. 3–238, 1992.

*Primary Examiner*—Margaret Rose Wambach
*Attorney, Agent, or Firm*—Ostrolenk, Faber, Gerb & Soffen

[57] ABSTRACT

In a sampling phase controlling apparatus for controlling a phase of a clock signal supplied to a transmission system including a discriminating circuit for discriminating a received signal and an equalizer for removing an intersymbol interference component from the received signal, a first phase control circuit is provided to control the phase of the clock signal in accordance with accumulated intersymbol interference components, and a second phase control circuit is provided to control the phase of the clock signal in accordance with the accumulated intersymbol interference components and a differential value thereof. One of the first and second phase control circuits is selected by a selector circuit.

11 Claims, 17 Drawing Sheets

JITTER-COMPENSATED SAMPLING PHASE CONTROL APPARATUS

BACKGROUND OF THE INVENTION

1. Field of the Invention

The present invention relates to a sampling phase control apparatus for use in a transmission system on a digital subscriber loop system.

2. Description of the Related Art

Generally, in a transmission system for use in a digital subscriber loop, a discriminating circuit for discriminating a sign of a received signal and an equalizer for removing an intersymbol interference component from the received signal are provided. On the other hand, a sampling phase control circuit is provided to control a phase of a baud rate clock signal supplied to the entire system including the equalizer.

In the above-mentioned system, a training period is provided as a set-up mode to establish a communication state such as a total duplex communication state. The set-up mode is classified into a cold start mode where the system is started from a fully-reset state and a warm start mode where the system is started from a subscriber line holding state. According to the American National Standards Institute (ANSI) standards, the training period for the cold start mode is prescribed to be within 15 s and the training period for the warm start mode is prescribed within 300 ms.

During the training period, the coefficients of an FIR filter of the equalizer and the like are converged and the phase of the phase sampling control circuit is captured (converged). However, the convergence of the equalizer and the like interferes with the capture of the phase of the sampling phase control circuit, thus prolonging the training period.

In a first prior art sampling phase control circuit, intersymbol interference components of received signals are accumulated, and the phase of the clock signal is advanced or retarded in accordance with the accumulated intersymbol interference components (see Y. Takahashi et al., "An ISDN Echo-Cancelling Tranceiver Chip Set for 2BIQ Coded U-Interface", IEEE Journal of Solid State Circuits Vol. 24, No. 6, Nov. 1989). In the first prior art sampling phase control circuit, however, the control speed of the phase of the clock signal is very low. As a result, the capture of the phase of the clock signal is delayed, and accordingly, the convergence of the equalizer and the like is delayed. Particularly, the prescribed training period for the warm start mode may not be satisfied. This will be explained later in detail.

In a second prior art sampling phase control circuit, intersymbol interference components of received signals are accumulated, and a differential value of the accumulated intersymbol interference components is calculated. Then, the phase of the clock signal is advanced or retarded in accordance with the accumulated intersymbol interference components and their differential values (see T. Ito et al., "A Fast Convergence Method for a Decision Feedback Equalizer Based on a Variable-Step Phase Control", IEICE Journal B-572, pp. 3–238, 1992). In the second prior art sampling phase control circuit, however, the control speed of the phase of the clock signal is very high. As a result, even after the equalizer and the like are converged, the phase of the clock signal has jitter.

SUMMARY OF THE INVENTION

It is an object of the present invention to provide a sampling phase control apparatus capable of suppressing jitter while having a high speed control.

According to the present invention, in a sampling phase controlling apparatus for controlling a phase of a clock signal supplied to a transmission system including a discriminating circuit for discriminating a received signal and an equalizer for removing an intersymbol interference component from the received signal, a first phase control circuit is provided to control the phase of the clock signal in accordance with accumulated intersymbol interference components, and a second phase control circuit is provided to control the phase of the clock signal in accordance with the accumulated intersymbol interference components and a differential value thereof. One of the first and second phase control circuits is selected by a selector circuit. Thus, after the phase control by the second phase control circuit is stabilized, the first phase control circuit is selected, thus suppressing the jittering of the phase of the clock signal.

BRIEF DESCRIPTION OF THE DRAWINGS

The present invention will be more clearly understood from the description as set forth below, with reference to the accompanying drawings, wherein.

DESCRIPTION OF THE PREFERRED EMBODIMENTS

Before the description of the preferred embodiments, prior art sampling phase control apparatuses will be explained with reference to FIGS. 1 through 9.

Figure 1:
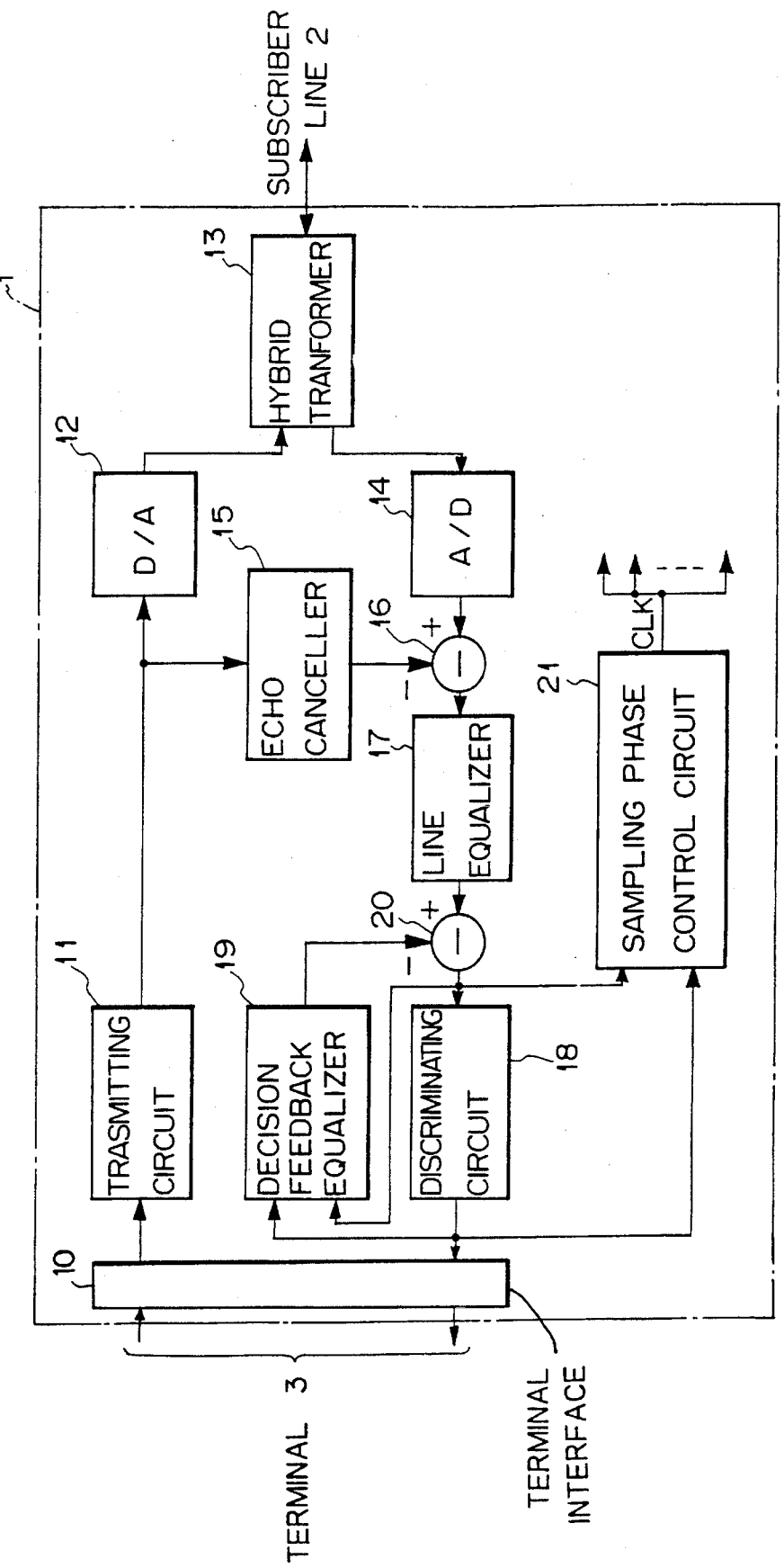
FIG. 1 is a block circuit diagram illustrating a general transmission system for use in a digital dual subscriber loop.

In FIG. 1, which illustrates a general digital subscriber loop system 1 between a dual subscriber line 2 and a subscriber terminal 3 such as a facsimile machine or a telephone apparatus, when a transmitting circuit 11 receives send data via a terminal interface 10 from the subscriber terminal 3, a digital transmitting signal is supplied from the transmitting circuit 11 to a digital/analog (D/A) converter 12 which performs a D/A conversion upon the digital transmitting signal to generate an analog signal. This analog signal is transmitted via a hybrid transformer 13 to the subscriber line 2. On the other hand, a received analog signal from the subscriber line 2 is supplied via the hybrid transformer 13 to an A/D converter 14 which performs an A/D conversion upon the received analog signal to generate a digital received signal.

The digital received signal output from the A/D converter 14 contains an echo component which is a reflection signal of the transmitting analog signal at the hybrid transformer 13. Such an echo component is removed from the digital received signal by an echo canceller 15 and a subtracter 16.

Also, the digital received signal output from the A/D converter 14 is distorted through the propagation of the subscriber line 2. This distortion of the digital received signal is recovered by a line equalizer 17 for equalizing the line loss.

Further, the digital received signal output from the A/D converter 14 contains an intersymbol interference component. Such an intersymbol interference component is removed by a discriminating circuit 18 for discriminating a sign of the digital received signal, a decision feedback equalizer 19 including an FIR filter, and a subtracter 20. Also, the output of the discriminating circuit 18 is supplied via the terminal interface 10 to the subscriber terminal 3.

The elements such as the decision feedback equalizer 19 are operated by a sampling clock signal CLK extracted from the digital received signal. The clock signal CLK is generated by a sampling phase control circuit 21 which is connected to the input and output of the discriminating circuit 18.

Figure 2:
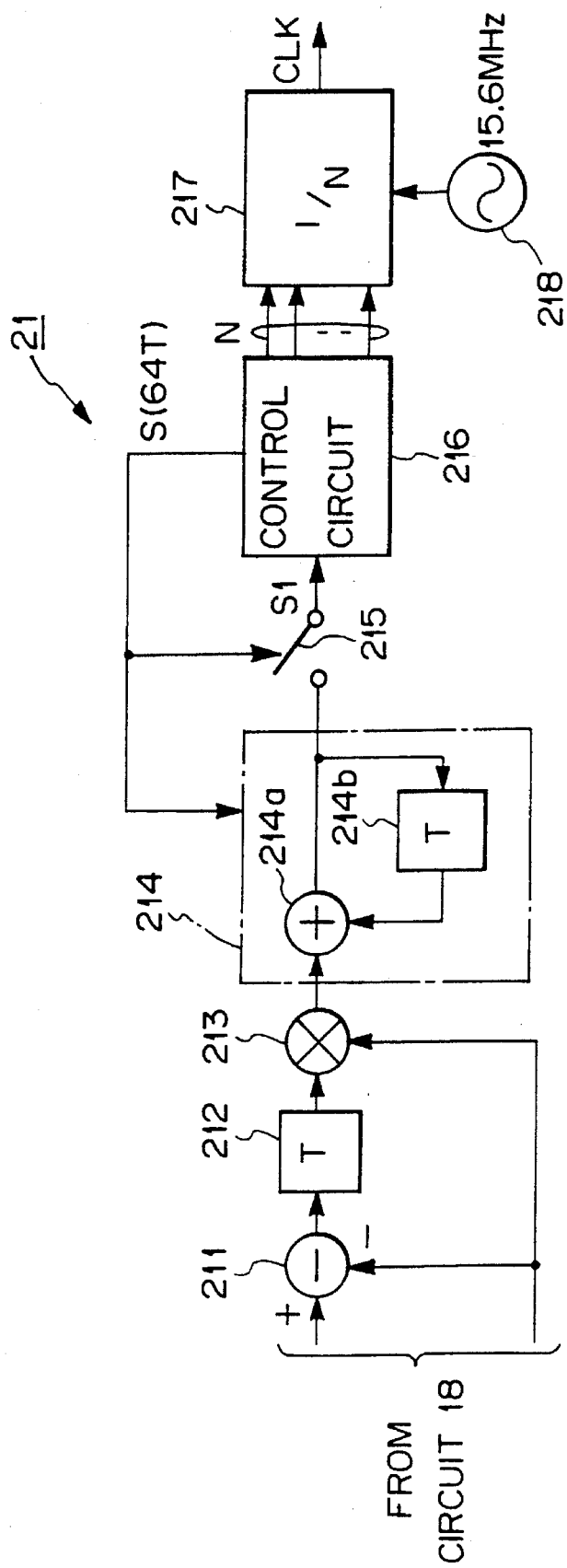
FIG. 2 is a circuit diagram illustrating a first prior art sampling phase control apparatus.

A first prior art sampling phase control apparatus (circuit) is illustrated in FIG. 2 (see the Y. Takahashi et al. literature). That is, a subtracter 211 calculates a difference between the input and output of the discriminating circuit 18, i.e., a residual intersymbol interference signal. The residual intersymbol interference signal is delayed by a delay circuit 212 having a delay time period which is the same as a baud rate period T (=1/80 kHz). An output of the delay circuit 212 and the output of the discriminating circuit 18 are supplied to a multiplexer 213 which generates a correlation signal between the residual intersymbol interference signals. The correlation signal is accumulated by an integrator 214 formed by an adder 214a and a delay circuit 214b having a delay time period T. The value of the integrator 214, i.e., an accumulated intersymbol interference component for a definite time period nT such as 64T is sampled by a sampler 215, and simultaneously, the accumulated intersymbol interference component of the integrator 214 is reset (initialized). The initialization of the integrator 214 and the operation of the sampler 215 are carried out by receiving a signal S (64T) from a control circuit 216.

The control circuit 216 is constructed by a microcomputer or the like. The control circuit 216 receives the accumulated intersymbol interference component signal S1 sampled by the sampler 215 to control the phase of the clock signal CLK, i.e., to control a frequency division ratio N of a 1/N frequency divider 217. In this case, the frequency divider 217 divides a signal generated from an oscillator 218 which has a frequency of 15.6 MHz, for example, by N. Also, the baud rate clock signal CLK has a frequency of about 80 kHz, and therefore, the control circuit 216 controls the phase of the clock signal CLK by the phase of the clock signal CLK by $\Delta\tau(=T/192\approx 65$ ns).

Figure 3:
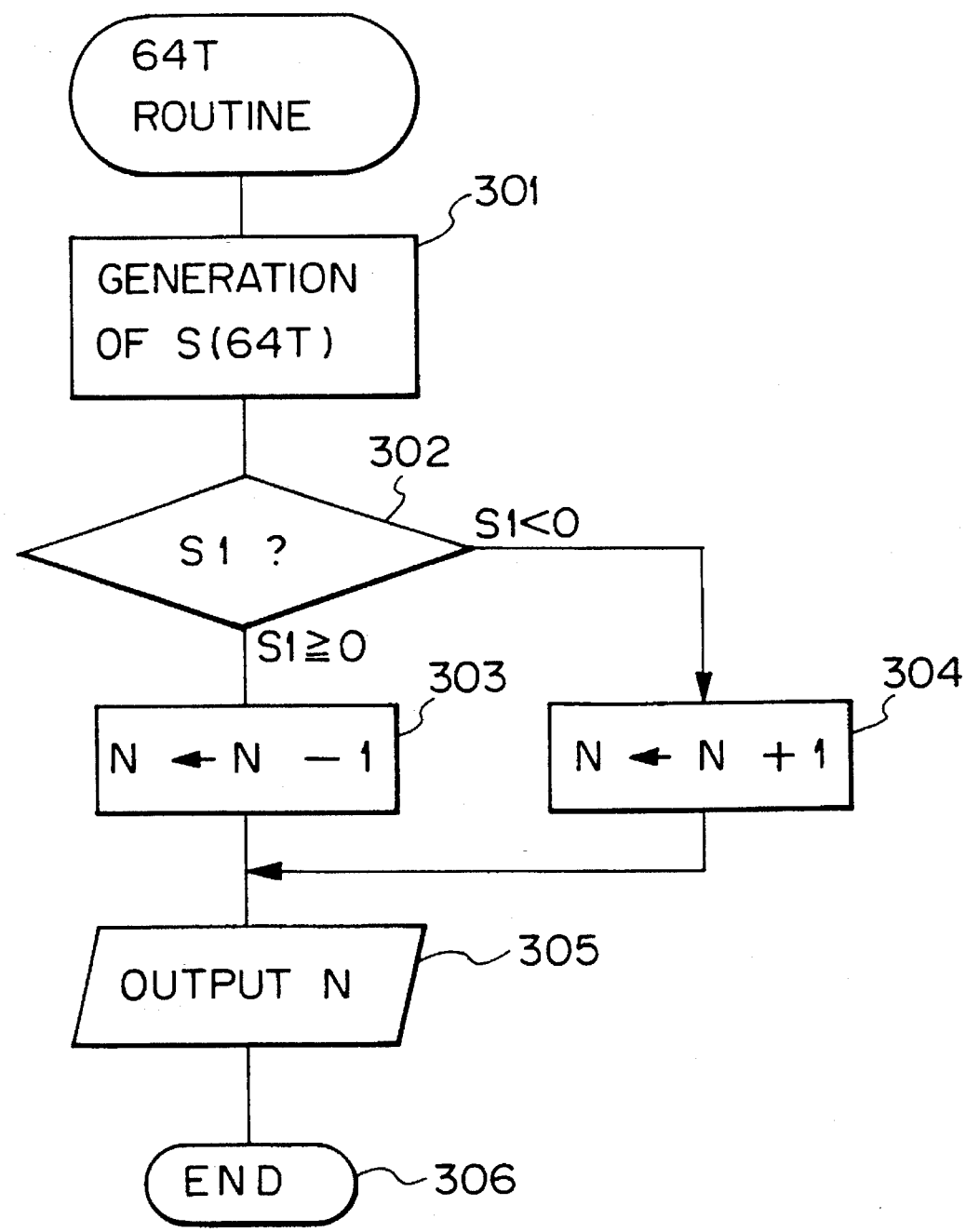
FIG. 3 is a flowchart showing the operation of the control circuit of FIG. 2.

The operation of the control circuit 216 of FIG. 2 is shown in FIG. 3. That is, the routine of FIG. 3 is carried out at time period 64T. At step 301, the control circuit 216 generates the signal S(64T) for controlling the integator 214 and the sampler 215.

At step 302, the control circuit 216 determined whether or not the accumulated intersymbol interference signal $S1 \geq 0$. If $S1 \geq 0$, the control proceeds to step 303, the frequency division ratio N is decreased by $$N \leftarrow N-1$$

As a result, the phase of the clock signal CLK is advanced by $\Delta\tau$. Conversely, If S1<0, the control proceeds to step 304 in which the frequency division ratio N is increased by $$N \leftarrow N+1$$

As a result, the phase of the clock signal CLK is retarded by $\Delta\tau$.

At step 305, the control circuit 216 outputs the frequency division ratio N to the frequency divider 217, and this routine is completed by step 306.

Thus, in the first prior art sampling phase control apparatus of FIG. 2, the phase of the clock signal CLK is advanced or retarded in accordance with the sign of the accumulated intersymbol interference signal S1.

Figure 4:
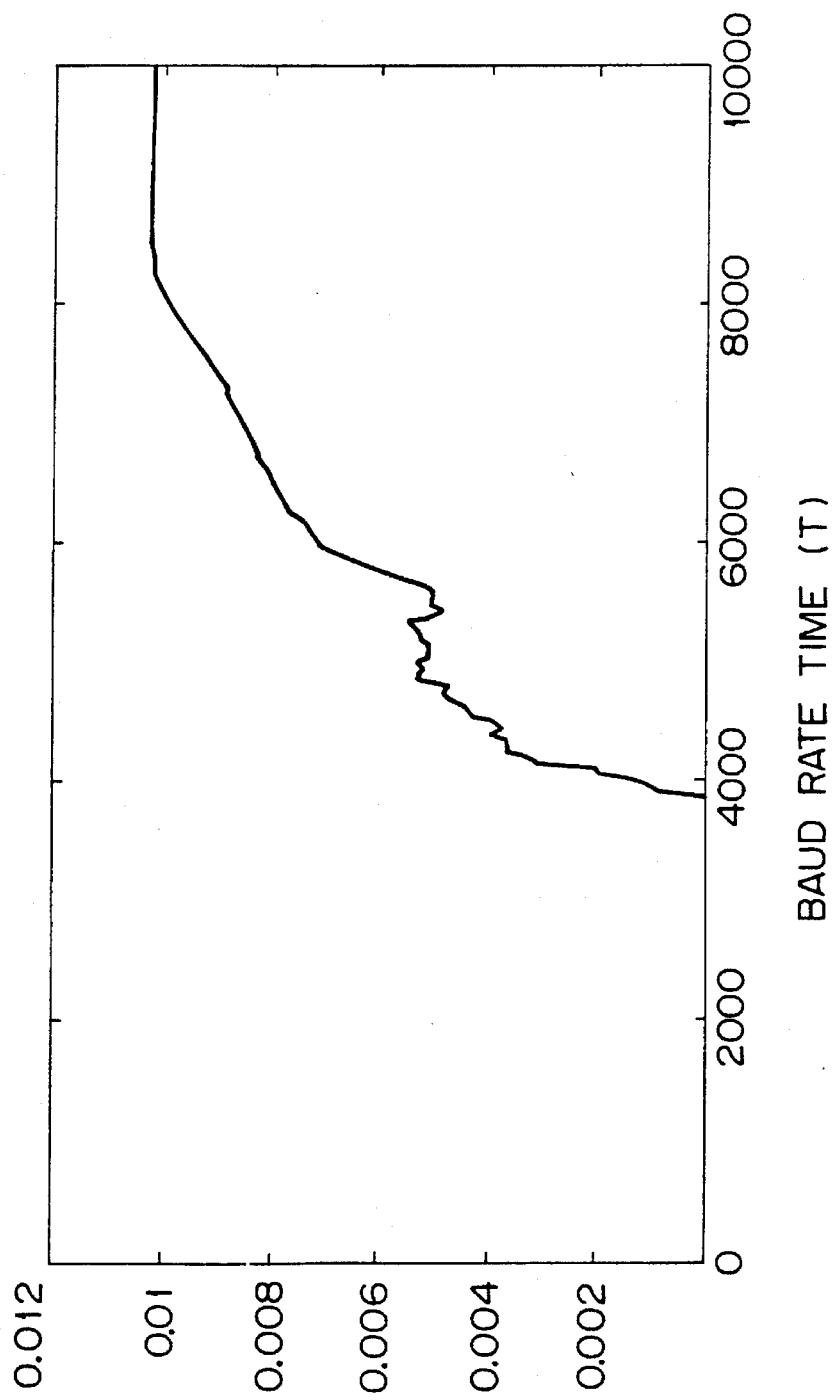
FIG. 4 is a timing diagram showing the total sum of squares of coefficients of the decision feedback equalizer of FIG. 1 to which the sampling phase control apparatus of FIG. 2 is applied.
Figure 5:
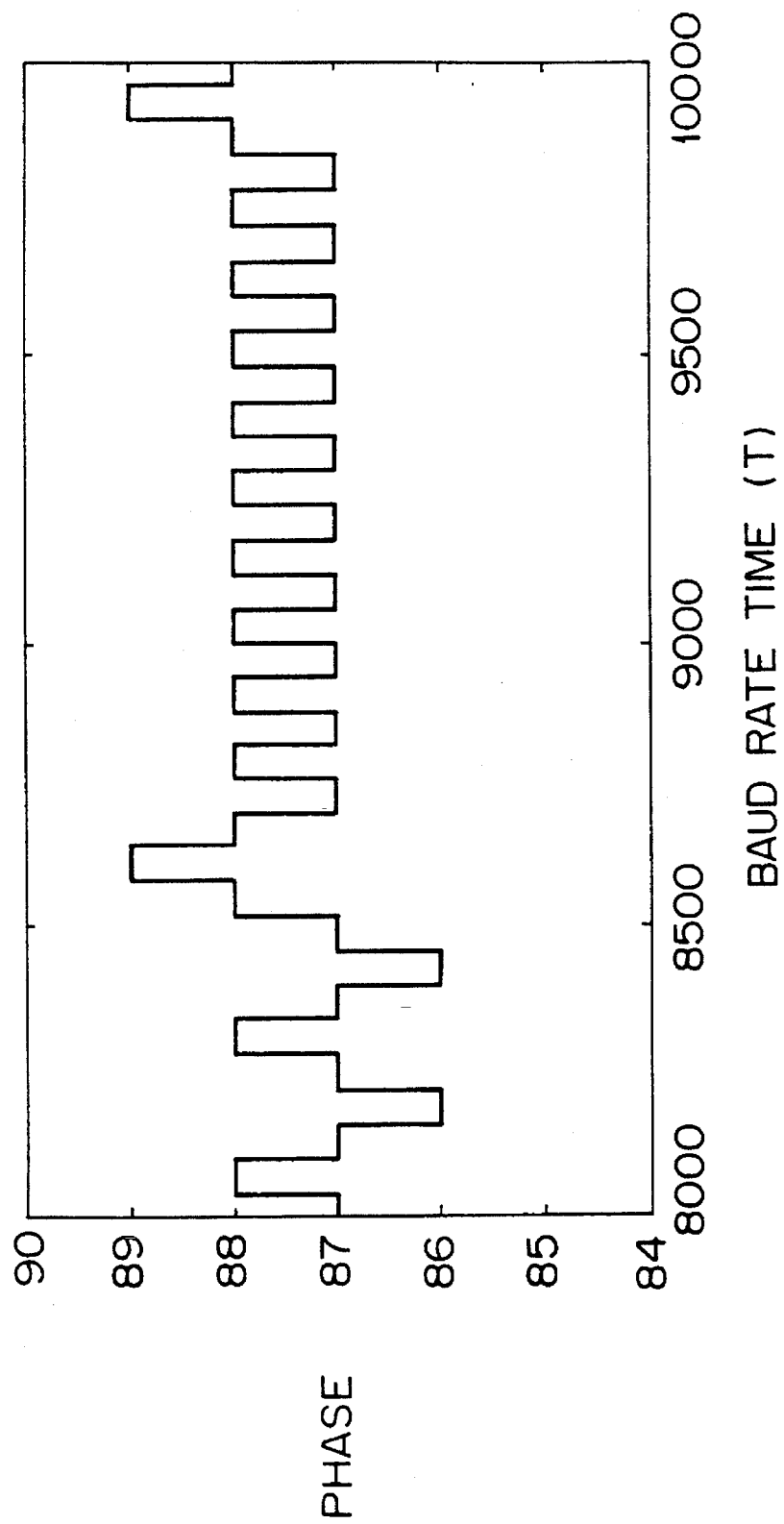
FIG. 5 is a timing diagram showing the phase of the clock signal of FIG. 2.

The convergence characteristics of the decision feedback equalizer 19 interfere with the capture characteristics of the phase of the clock signal CLK. In FIG. 4, which shows convergence characteristics obtained by the first prior art sampling phase control apparatus of FIG. 2, the abscissa indicates a baud rate sampling time and the ordinate indicates a total sum of squares of coefficients of the FIR filter of the decision feedback equalizer 19. That is, it takes a long time, for example, about 4400 T (=55 ms) (3800 T to 8200 T) for the total sum of squares of coefficients to converge. On the contrary, in FIG. 5, which shows the phase characteristics after the total sum of squares of coefficients has completely converged, the jittering is small.

Figure 6:
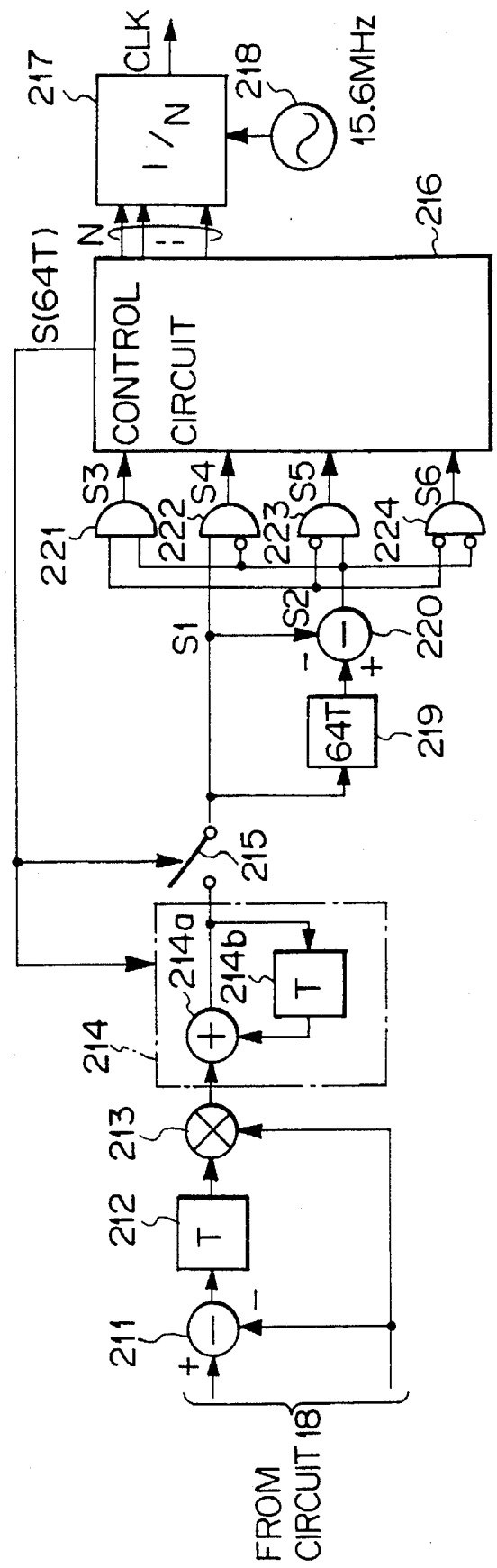
FIG. 6 is a circuit diagram illustrating a second prior art sampling phase control apparatus.

A second prior art sampling phase control apparatus as illustrated in FIG. 6 reduces the time required for the convergence of the total sum of squares of coefficients (see the T. Ito et al. literature). In FIG. 6, a delay circuit 219 having a delay time period 64T, a subtracter 220, and gates 221 through 224 are added to the elements of FIG. 2. That is, the delay circuit 219 and the subtracter 220 form a differentiator for differentiating the signal S1 to generate a differential value signal S2. When the signals S1 and S2 are both positive (including 0), an output signal S3 of the gate 221 is "1". Also, when the signals S1 and S2 are positive (including 0) and negative, respectively, an output signal S4 of the gate 222 is "1". Further, when the signals S1 and S2 are negative and positive (including 0), respectively, an output signal S5 of the gate 223 is "1". Still further, when the signals S1 and S2 are both negative, an output signal S6 of the gate 224 is "1". Note that one of the gates 221 through 224 can be omitted, since one of the signals S3 through S6 can be represented by a NOR logic of the other three signals.

The control circuit 216 receives the signals S3, S4, S5 and S6 to control the phase of the clock signal CLK. In this case, the signal S6 is meaningless.

Figure 7:
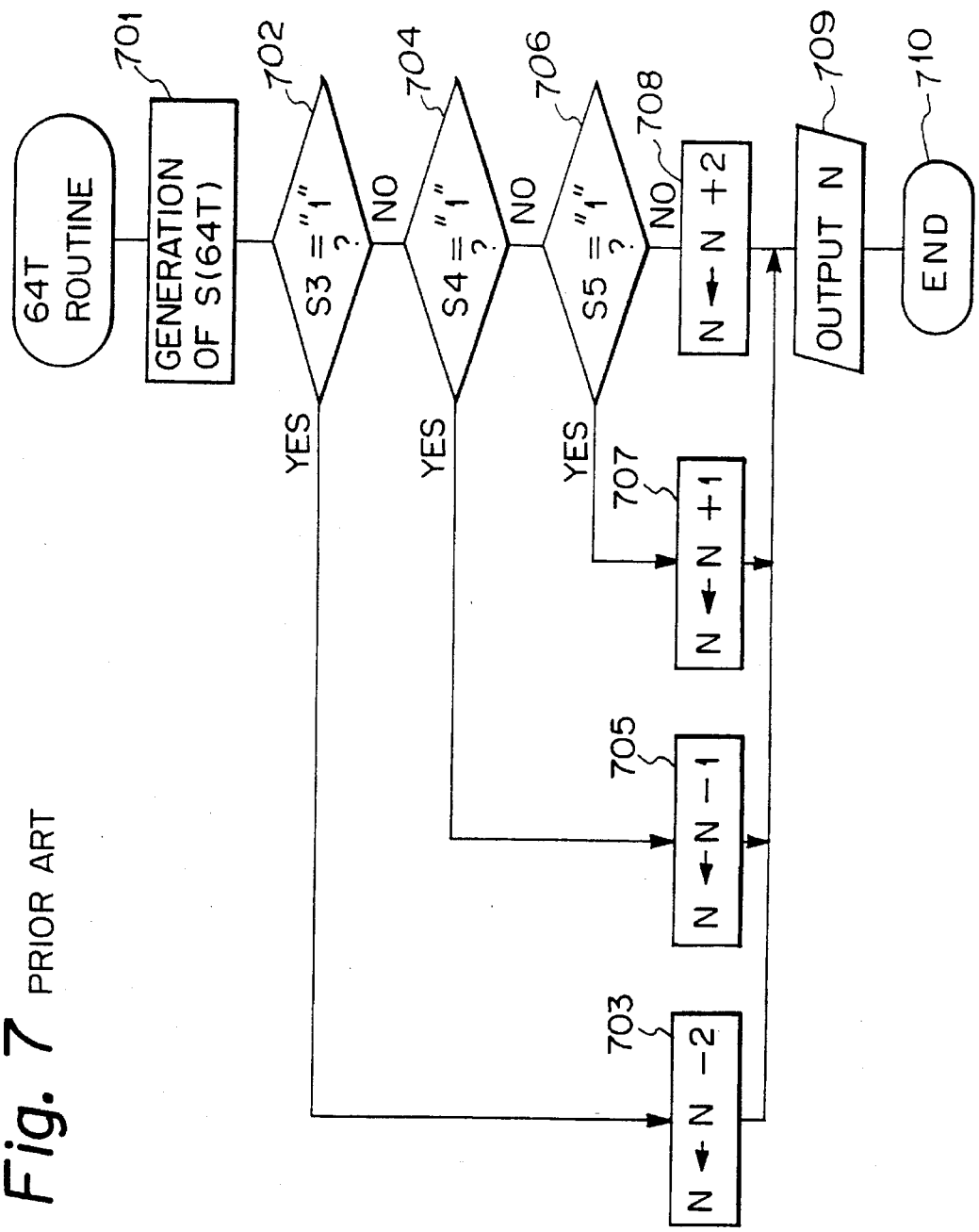
FIG. 7 is a flowchart showing the operation of the control circuit of FIG. 6.

The operation of the control circuit 216 of FIG. 6 is shown in FIG. 7. That is, the routine of FIG. 7 is also carried out at time period 64T. At step 701, the control circuit 216 generates the signal S (64T) for controlling the integator 214 and the sample 215.

At step 702, the control circuit 216 determines whether or not the signal S3 is "1". If S3="1", the control proceeds to step 703 in which the frequency division ratio N is decreased by $$N \leftarrow N-2$$

As a result, the phase of the clock signal CLK is advanced by $2\Delta\tau$. Otherwise, the control proceeds to step 704.

At step 704, the control circuit 216 determines whether or not the signal S4 is "1". If S4="1", the control proceeds to step 705 in which the frequency division ratio N is decreased by $$N \leftarrow N-1$$

As a result, the phase of the clock signal CLK is advanced by $\Delta\tau$. Otherwise, the control proceeds to step 706.

At step 706, the control circuit 216 determines whether or not the signal S5 is "1". If S5="1", the control proceeds to step 707 in which the frequency division ratio N is increased by $$N \leftarrow N+1$$

As a result, the phase of the clock signal CLK is retarded by $\Delta\tau$. Otherwise, the control proceeds to step 708.

At step 708, the frequency division ratio N is increased by $$N \leftarrow N+2$$

As a result, the phase of the clock signal CLK is retarded by $2\Delta\tau$.

At step 709, the control circuit 216 outputs the frequency division ratio N to the frequency divider 217, and this routine is completed by step 710.

Thus, in the second prior art sampling phase control apparatus of FIG. 6, the phase of the clock signal CLK is advanced or retarded in accordance with the sign of the accumulated intersymbol interference signal S1 and its differential value signal S2.

Figure 8:
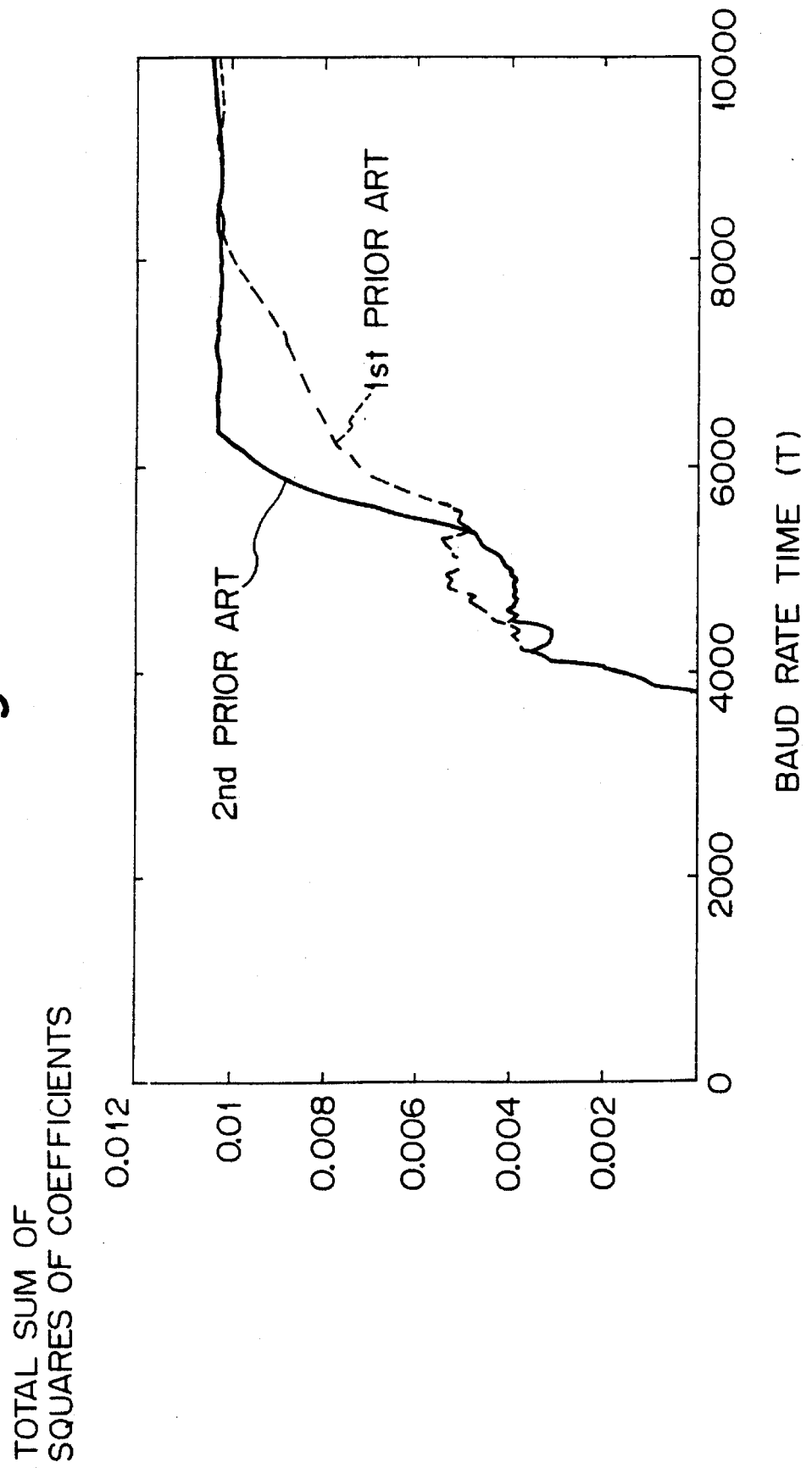
FIG. 8 is a timing diagram showing the total sum of squares of coefficients of the decision feedback equalizer of FIG. 1 to which the sampling phase control apparatus of FIG. 6 is applied.
Figure 9:
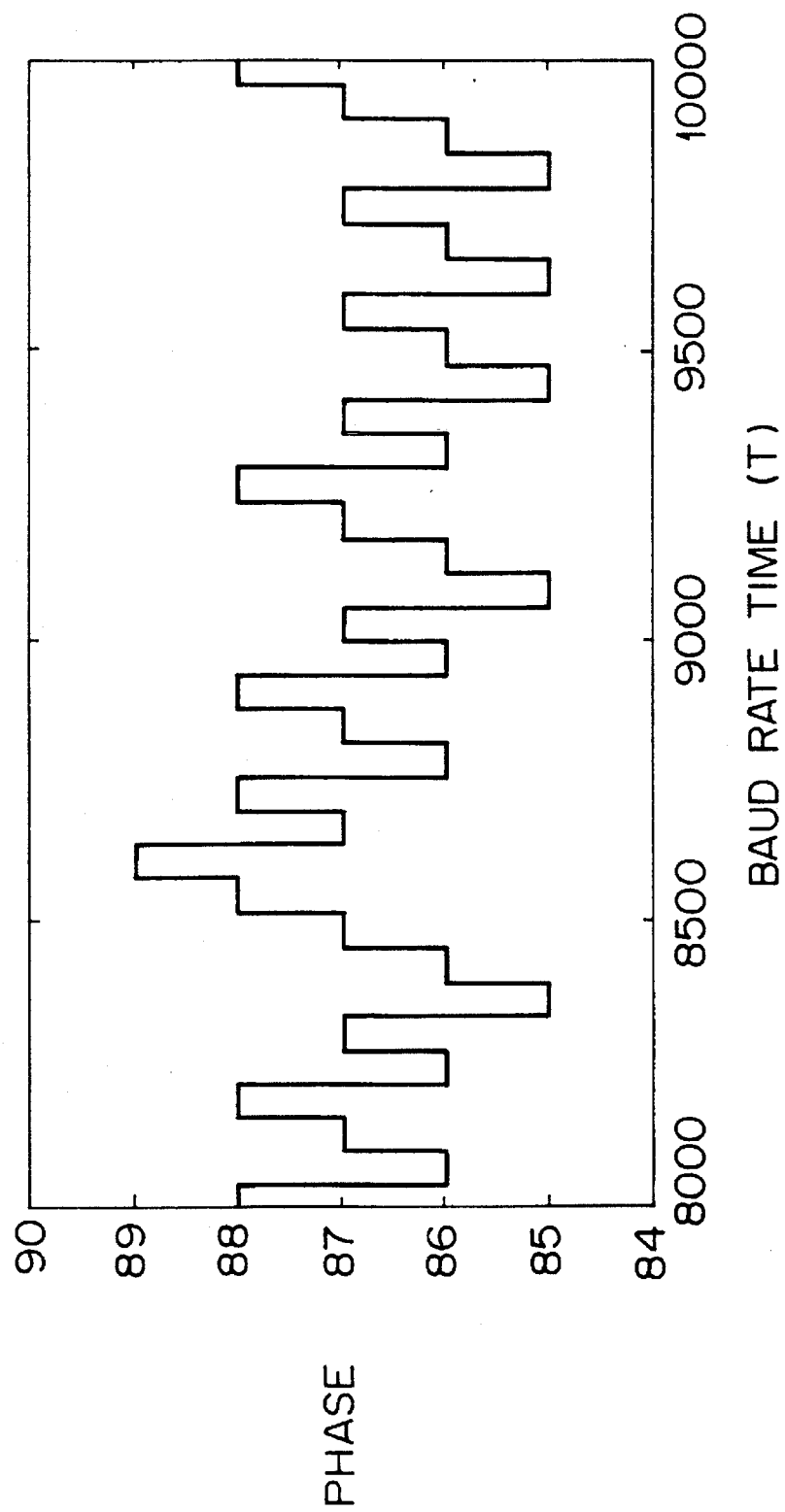
FIG. 9 is a timing diagram showing the phase of the clock signal of FIG. 6.

As shown in FIG. 8, which shows convergence characteristics obtained by the second prior art sampling phase control apparatus of FIG. 6, it takes a short time such as about 2500 T (=31 ms) (3800 T to 6300 T) for the total sum of squares of coefficients to converge. However, as shown, in FIG. 9, which shows the phase characteristics after the total sum of squares of coefficients has completely converged, the jittering is larger than in the first prior art sampling phase control apparatus.

Figure 10:
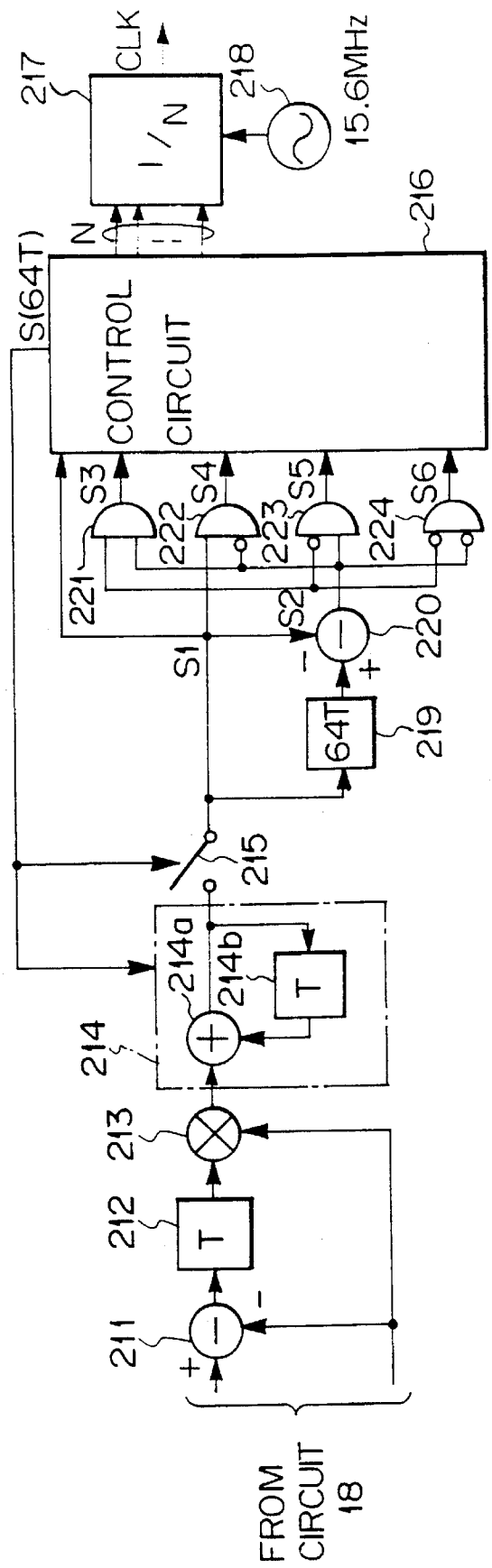
FIG. 10 is a circuit diagram illustrating a first embodiment of the sampling phase control apparatus according to the present invention.

In FIG. 10, which illustrates a first embodiment of the present invention, the signal S1 is also supplied to the control circuit 216 in FIG. 6, thus enabling both the operation as shown in FIG. 3 and the operation as shown in FIG. 7. That is, first, the operation as shown in FIG. 7 is selected to enhance the convergence speed of the total sum of squares of coefficients of the FIR filter. After the total sum of squares of coefficients of the FIR filter is converged, the operation as shown in FIG. 3 is selected to suppress the jittering of the phase of the clock signal CLK.

Figure 11:
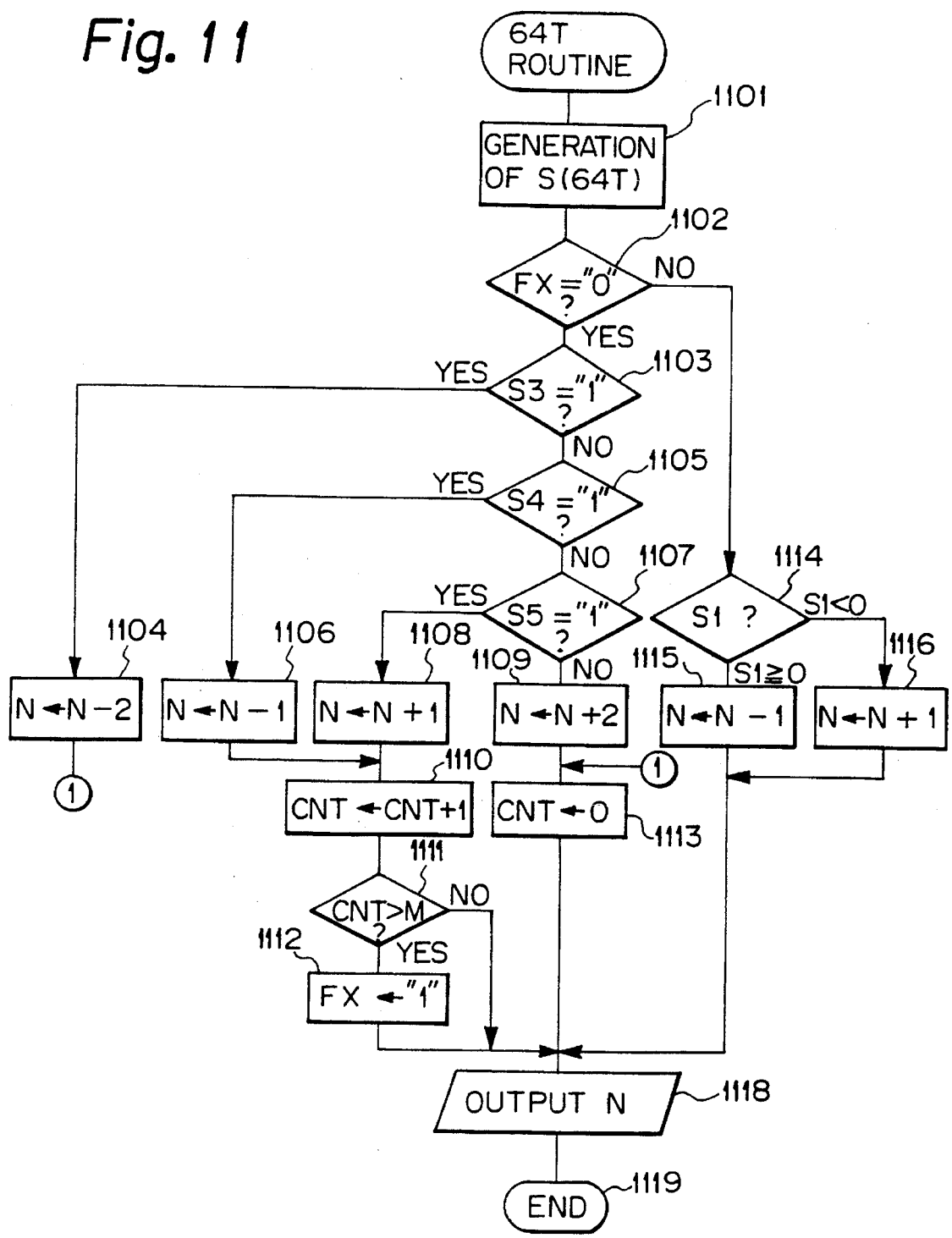
FIGS. 11, 12A and 12B are flowcharts showing the operation of the control circuit of FIG. 10.

The operation of the control circuit 216 of FIG. 10 is shown in FIG. 11. That is, the routine of FIG. 11 is also carried out at time period 64T. Also, note that a flag FX for switching an operation using the signal S1 and an operation using the signals S3 to S6 is reset by an initial routine (not shown). Further, a value of a counter CNT for counting states where the signal S4 or S5 is "1", i.e., where the sign of the signal S1 is opposite to that of the signal S2. Also, steps 1103 to 1109 correspond to steps 702 to 708, respectively, of FIG. 7, and steps 1114 to 1116 correspond to steps 302 to 304, respectively, of FIG. 3. At step 1101, the control circuit 216 generates the signal S (64T) for controlling the integrator 214 and the sampler 215.

At step 1102, it is determined whether or not the flag FX is "0". If FX="0", the control proceeds to step 1103, thus controlling the phase of the clock signal CLK by using the signals S3 to S6. Conversely, if FX= "1", the control proceeds to step 1114, thus controlling the phase of the clock signal CLK by using the signal S1. Initially, since FX="0", the control proceeds to step 1103.

At step 1103, the control circuit 216 determines whether or not the signal S3 is "1". If S3="1", the control proceeds to step 1104 in which the frequency division ratio N is decreased by $$N \leftarrow N-2$$

As a result, the phase of the clock signal CLK is advanced by $2\Delta\tau$. Otherwise, the control proceeds to step 1105.

At step 1105, the control circuit 216 determines whether or not the signal S4 is "1". If S4="1", the control proceeds to step 1106 in which the frequency division ratio N is decreased by $$N \leftarrow N-1$$

As a result, the phase of the clock signal CLK is advanced by $\Delta\tau$. Otherwise, the control proceeds to step 1107.

At step 1107, the control circuit 216 determines whether or not the signal S5 is "1" If S5="1" the control proceeds to step 1108 in which the frequency division ratio N is increased by $$N \leftarrow N+1$$

As a result, the phase of the clock signal CLK is retarded by $\Delta\tau$. Otherwise, the control proceeds to step 1109.

At step 1109, the frequency division ratio N is increased by $$N \leftarrow N+2$$

As a result, the phase of the clock signal CLK is retarded by $2\Delta\tau$.

The control at steps 1106 and 1108 proceeds to steps 1110 to 1112. That is, at step 1110, the value of the counter CNT is counted up by +1, and, at step 1111, it is determined whether or not CNT>M, where M is 2 or 3. As a result, only when CNT>M, does the control proceed to step 1112 which sets the flag FX.

On the other hand the control at steps 1104 and 1109 proceeds to step 1113 which resets the value of the counter CNT, i.e., CNT=0.

At step 1118, the control circuit 216 outputs the frequency division ratio N to the frequency divider 217, and this routine is completed by step 1119.

After the flag FX is set, when the routine of FIG. 11 is again carried out, the control at step 1102 is switched to steps 1114 to 1116.

At step 1114, the control circuit 216 determines whether or not the accumulated intersymbol interference signal S1≧0. If S1≧0, the control proceeds to step 1115 in which the frequency division ratio N is decreased by

N←N−1

As a result, the phase of the clock signal CLK is advanced by Δτ. Conversely, If S1<0, the control proceeds to step 1115 in which the frequency division ratio N is increased by

N←N+1

As a result, the phase of the clock signal CLK is retarded by Δτ.

The control at steps 1115 and 1116 proceeds to step 1118.

Thus, according to the routine of FIG. 11, the phase of the clock signal CLK is advanced or retarded in accordance with the sign of the accumulated intersymbol interference signal S1 and its differential value signal S2. Then, after it is determined that the phase of the clock signal CLK is captured (or converged) by the value of the counter CNT, the phase of the clock signal CLK is advanced or retarded in accordance with the sign of the accumulated intersymbol interference signal S1, thus suppressing the jittering of the phase of the clock signal CLK.

Figure 12A:
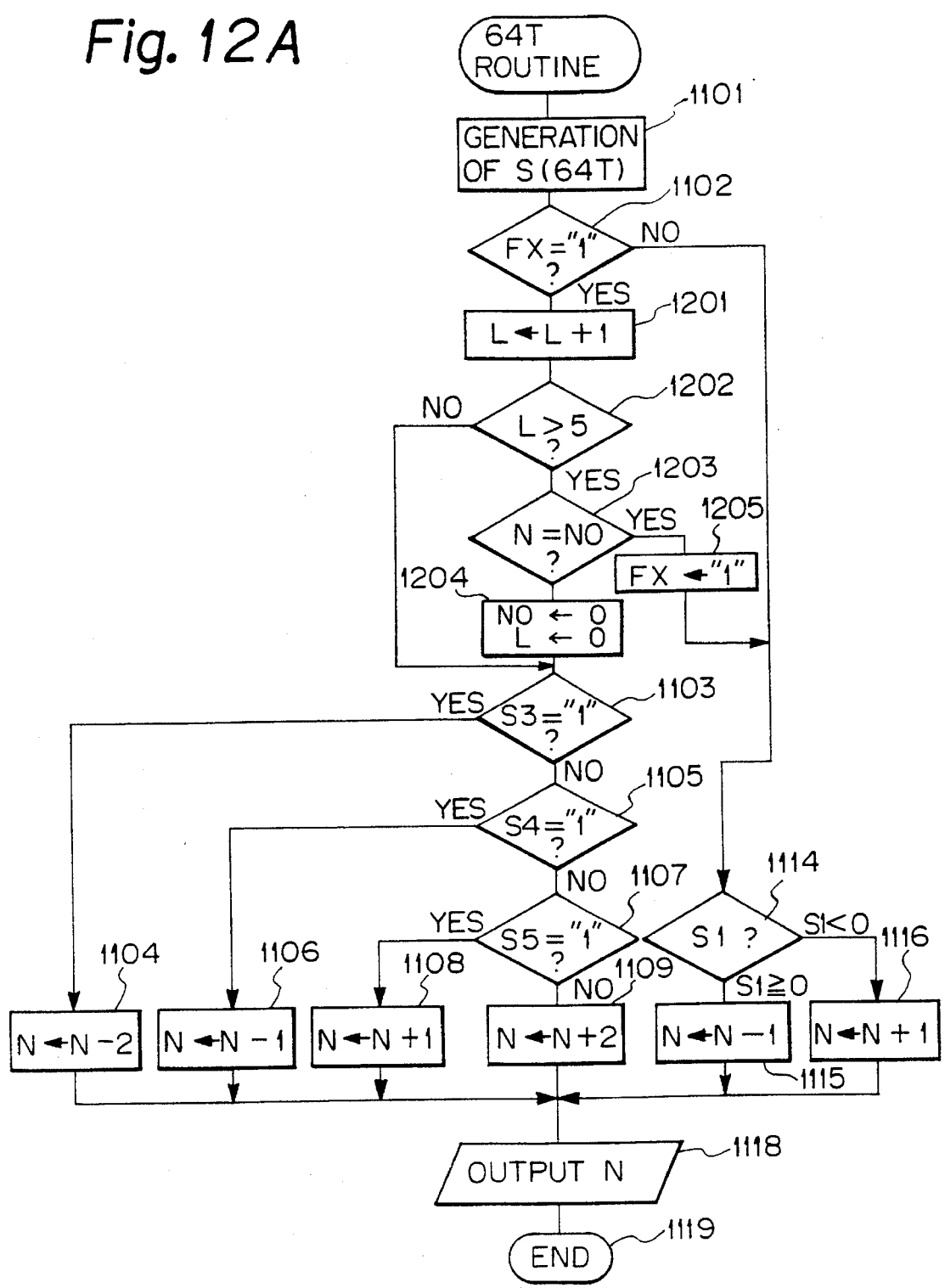

In FIG. 12A, which is a modification of the routine of FIG. 11, steps 1201 through 1205 are provided instead of seeps 1110 to 1113 of FIG. 11. In FIG. 12A, the convergence of the phase of the clock signal CLK is determined by determining whether or not the current phase of the clock signal CLK coincides with an old phase of the clock signal, which is, for example, the phase of the clock signal CLK a definite time period such as L×64T ago. That is, at step 1201, a value of a counter L is counted up by +1, and at step 1202, it is determined whether or not the value of the counter L is larger than a definite number such as 5. Only when L>5, does the control proceed to step 1203. Otherwise, the control proceeds to step 1103.

At step 1203, it is determined whether or not the current phase N of the clock signal CLK coincides with the old phase N0 of the clock signal CLK. Only when N equals N0, does the control proceed to step 1205 which sets the flag FX. Otherwise, the control proceeds to step 1204 which replaces N0 with N and resets the counter L, and then proceeds to step 1103.

Figure 12B:
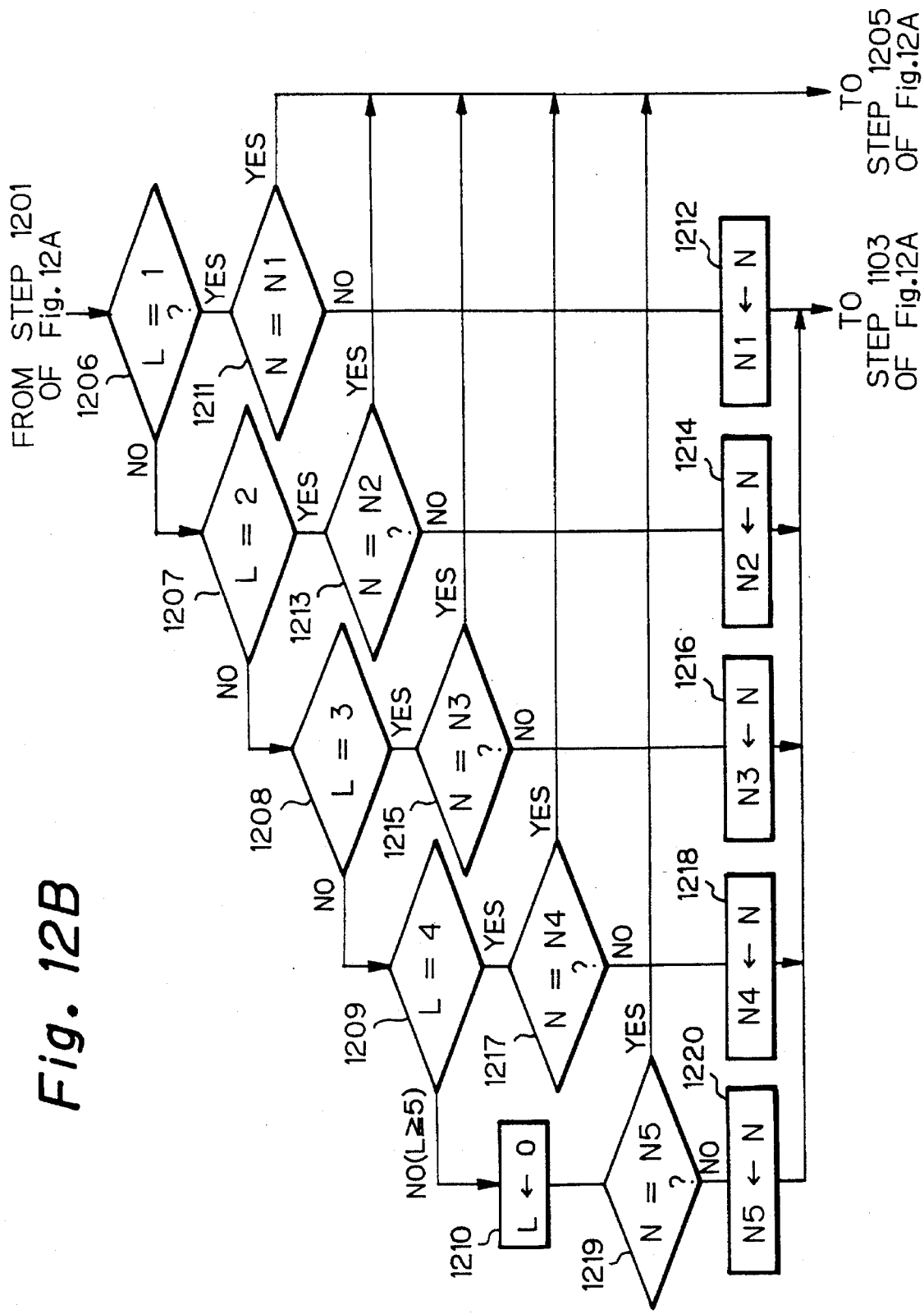

Further, steps 1202 through 1204 of FIG. 12A can be replaced by steps 1206 through 1220 of FIG. 12B. That is, the control at step 1201 of FIG. 12A proceeds to step 1206. At steps 1206 through 1209, it is determined whether the value of the counter L is 1, 2, 3 or 4. If the value of the counter L is larger than 5, the control proceeds to step 1210 which resets the value of the counter L.

If L=1, the control proceeds to step 1211 which determines whether or not the current phase N of the clock signal CLK coincides with the old phase N1 of the clock signal CLK. Only when N equals N1, does the control proceeds to step 1205 of FIG. 12A. Otherwise, the control proceeds to step 1212 which replaces the old phase N1 with the current phase N.

If L=2, the control proceeds to step 1213 which determines whether or not the current phase N of the clock signal CLK coincides with the old phase N2 of the clock signal CLK. Only when N equals N2, does the control proceeds to step 1205 of FIG. 12A. Otherwise, the control proceeds to step 1214 which replaces the old phase N2 with the current phase N.

If L=3, the control proceeds to step 1215 which determines whether or not the current phase N of the clock signal CLK coincides with the old phase N3 of the clock signal CLK. Only when N equals N3, does the control proceeds to step 1205 of FIG. 12A. Otherwise, the control proceeds to step 1216 which replaces the old phase N3 with the current phase N.

If L=4, the control proceeds to step 1217 which determines whether or not the current phase N of the clock signal CLK coincides with the old phase N4 of the clock signal CLK. Only when N equals N4, does the control proceeds to step 1205 of FIG. 12A. Otherwise, the control proceeds to step 1218 which replaces the old phase N4 with the current phase N.

The control at step 1210 proceeds to step 1219 which determines whether or not the current phase N of the clock signal CLK coincides with the old phase N5 of the clock signal CLK. Only when N equals N5, does the control proceeds to step 1205 of FIG. 12A. Otherwise, the control proceeds to step 1220 which replaces the old phase N5 with the current phase N.

The control at steps 1212 through 1220 proceeds to step 1103 of FIG. 12A.

Thus, according to the routine of FIGS. 12A and 12B, the phase of the clock signal CLK is advanced or retarded in accordance with the sign of the accumulated intersymbol interference signal S1 and its differential value signal S2. Then, after it is determined that the phase of the clock signal CLK is captured (or converged) by the coincidence between the current phase and old phase of the clock signal CLK, the phase of the clock signal CLK is advanced or retarded in accordance with the sign of the accumulated intersymbol interference signal S1, thus suppressing the jittering of the phase of the clock signal CLK.

Figure 13:
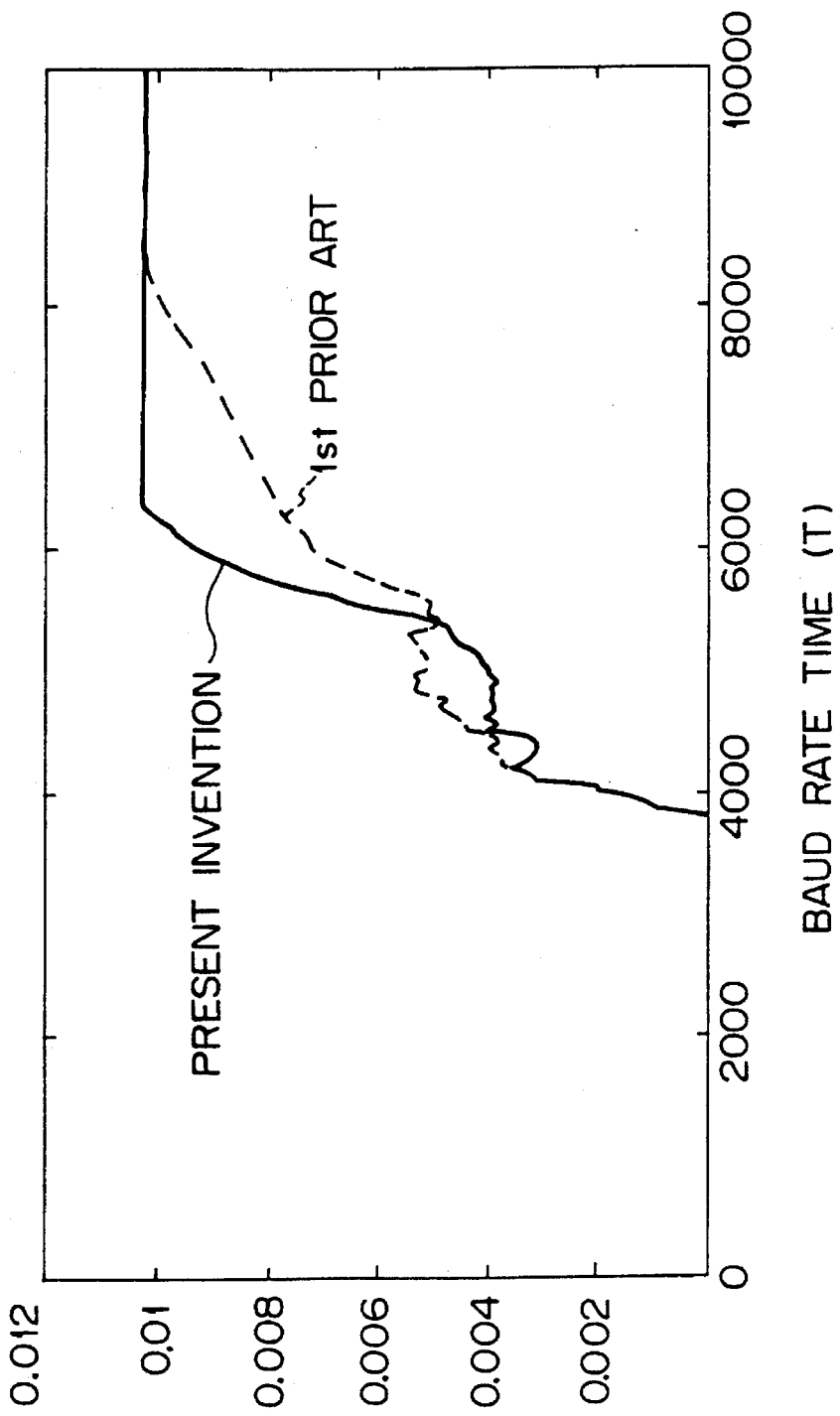
FIG. 13 is a timing diagram showing the total sum of squares of coefficients of the decision feedback equalizer of FIG. 1 to which the sampling phase control apparatus of FIG. 10 is applied.
Figure 14:
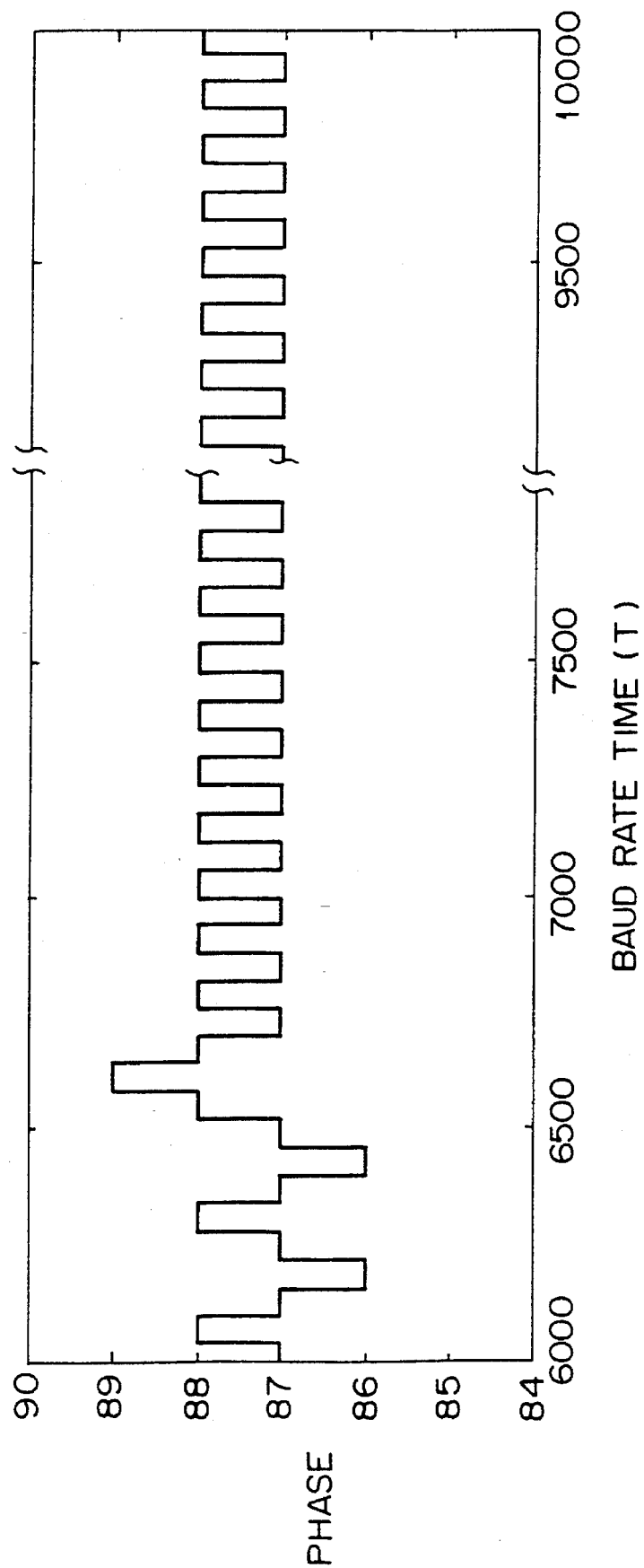
FIG. 14 is a timing diagram showing the phase of the clock signal of FIG. 10.

As shown in FIG. 13, which shows convergence characteristics obtained by the sampling phase control apparatus of FIG. 10, it takes a short time such as about 2500 T (=31 ms) (3800 T to 6300 T) for the total sum of squares of coefficients to converge, in the same way as in the second prior art sampling phase control apparatus of FIG. 6. Simultaneously, as shown in FIG. 14, which shows the phase characteristics after the total sum of squares of coefficients has completely converged, the jittering is small the same as in the first sampling phase control apparatus of FIG. 2.

Figure 15:
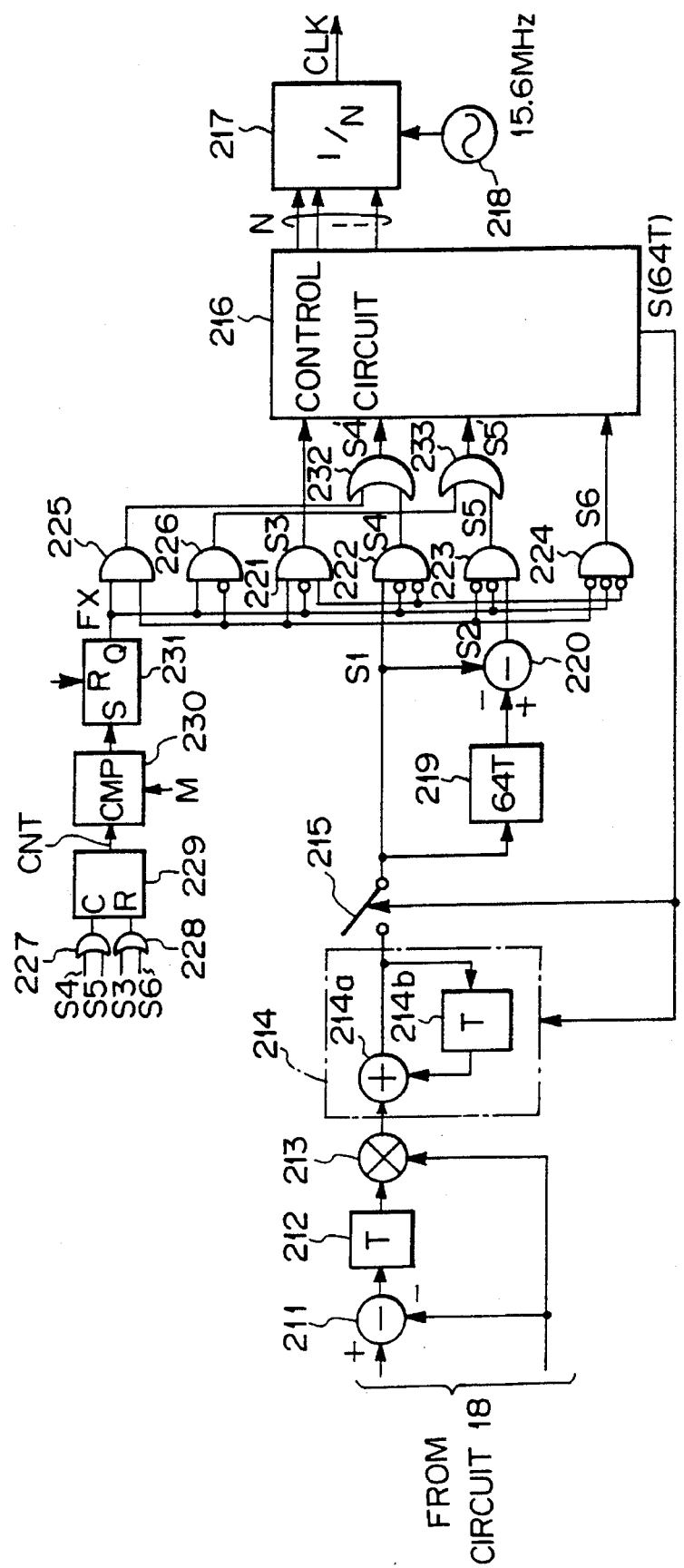
FIG. 15 is a circuit diagram illustrating a second embodiment of the sampling phase control apparatus according to the present invention.

The operation of the routine of FIG. 11 is also carried out by a second embodiment of the sampling phase control apparatus as illustrated in FIG. 15. In FIG. 15, gates 225 and 226 for carrying out the operation as shown in FIG. 3, OR gates 227 and 228, a counter 229 corresponding to step 1110 and 1113 of FIG. 11, a comparator 230 corresponding to step 1111 of FIG. 11, a flip-flop 231 for generating the flag FX, and OR gates 232 and 233 are added to the elements of FIG. 6. In this case, the control circuit 216 of FIG. 15 operates in the same way as the control circuit 216 of FIG. 6, i.e., the routine of FIG. 7 is carried out.

That is, the counter 229 counts the signals S4 and S5, and is reset by the signal S3 or S6. The comparator 230 compares the value CNT of the counter 229 with the definite value M. As a result, only when CNT> M, does the comparator 230 set the flip-flop 231, i.e., sets the flag FX. Thus, the gates 221 through 224 are disabled and the gates 225 and 226 are enabled, thus switching the operation as shown in FIG. 7 to the operation as shown in FIG. 3. Note that the flip-flop 231 is initially reset by the control circuit 216.

Figure 16:
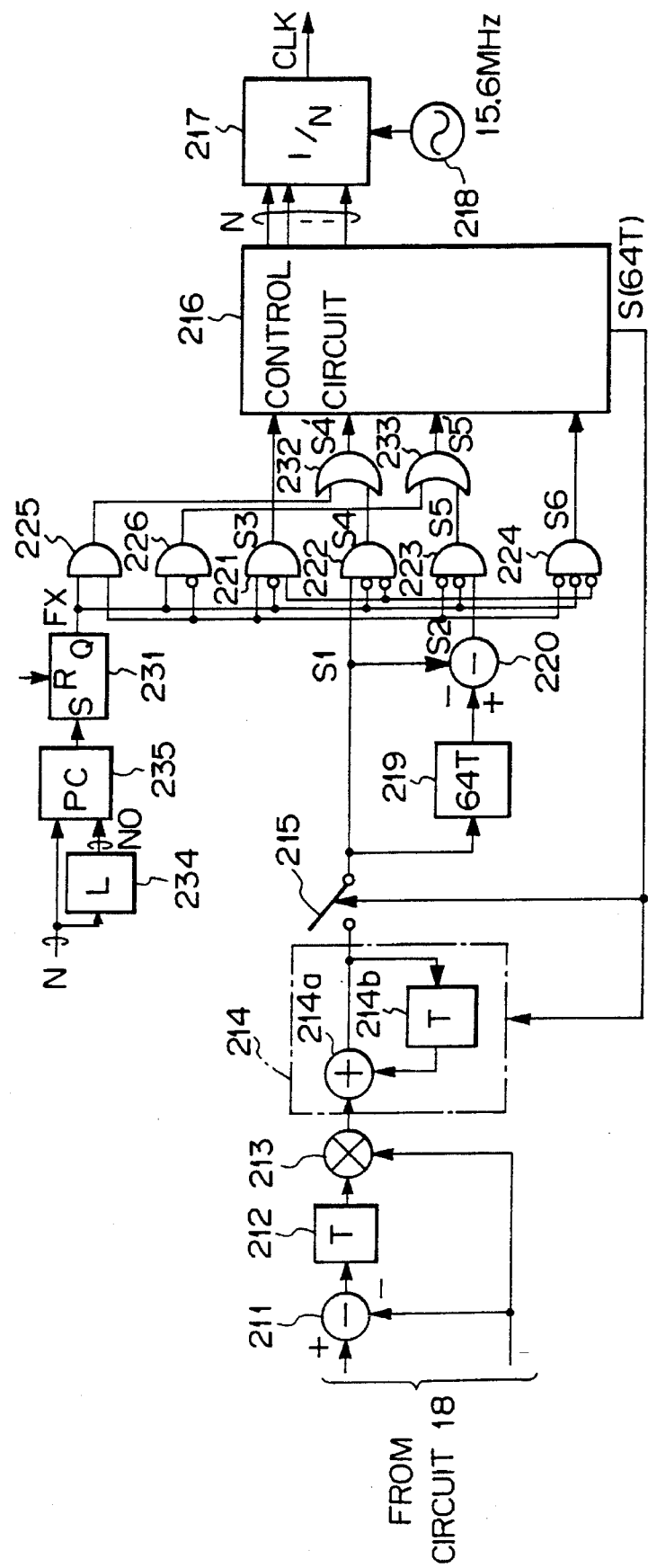
FIG. 16 is a circuit diagram illustrating a third embodiment of the sampling phase control apparatus according to the present invention.

The operation of the routine of FIG. 12B is also carried out by a third embodiment of the sampling phase control apparatus as illustrated in FIG. 16. In FIG. 16, a delay circuit 234 having a delay time period of L×64T and a phase comparator 235 are provided instead of the OR gates 227 and 228 and the counter 230 of FIG. 15. The delay circuit 234 serves as steps 1201 and 1202 of FIG. 12A or steps 1206 to 1210 of FIG. 12B, and the phase comparator 235 serves as step 1203 of FIG. 12A or steps 1211, 1213, 1215, 1217 and 1219 of FIG. 12B.

That is, the phase comparator 235 compares the current phase N of the control circuit 216 with the old phase N0 of the delay circuit 234.

As a result, only when N=N0, does the phase comparator 235 set the flip-flop 231, i.e., sets the flag FX. Thus, the gates 221 through 224 are disabled and the gates 225 and 226 are enabled, thus switching the operation as shown in FIG. 7 to the operation as shown in FIG. 3.

As explained hereinbefore, according to the present invention, the convergence (capture) of the phase of a clock signal can be obtained at a high speed and simultaneously, after the phase of the clock signal is converged, the jittering of the phase of the clock signal can be suppressed.

We claim:

1. A sampling phase controlling apparatus for controlling a phase of a clock signal supplied to a transmission system including discriminating means for discriminating a received signal and equalizing means for removing an intersymbol interference component from the received signal, comprising:

intersymbol interference detecting means for detecting the intersymbol interference component;

accumulating means for accumulating the intersymbol interference component for a certain time period;

differential value calculating means for calculating a differential value of the accumulated intersymbol interference component;

first phase control means for controlling the phase of the clock signal in accordance with the accumulated intersymbol interference component;

second phase control means for controlling the phase of the clock signal in accordance with a combination of the accumulated intersymbol interference component and the differential value thereof; and selecting means for selecting one of said first and second phase controlling means.

2. An apparatus as set forth in claim 1, wherein said first phase control means changes the phase of the clock signal by a first definite value in accordance with the accumulated intersymbol interference component, said second phase control means changing the phase of the clock signal by one of the first definite value and a second definite value larger than the first definite value in accordance with the accumulated intersymbol interference component and the differential value thereof.

3. An apparatus as set forth in claim 1, wherein said first phase control means advances the phase of the clock signal by a first definite value when the accumulated intersymbol interference component is positive and retards the phase of the clock signal by the first definite value when the accumulated intersymbol interference component is negative, said second phase control means advancing the phase of the clock signal by a second definite value larger than the first definite value when the accumulated intersymbol interference component and the differential value thereof are both positive, advancing the phase of the clock signal by the first definite value when the accumulated intersymbol interference component is positive and the differential value thereof is negative, retarding the phase of the clock signal by the second definite value when the accumulated intersymbol interference component and the differential value thereof are both negative, and retarding the phase of the clock signal by the first definite value when the accumulated intersymbol interference component is negative and the differential value thereof is positive.

4. An apparatus as set forth in claim 1, wherein said selecting means comprises:

determining means for determining whether or not the phase of the clock signal is converged when selecting said second phase control means; and selecting said first phase control means after it is determined that the phase of the clock signal is converged.

5. An apparatus as set forth in claim 1, wherein said selecting means comprises;

counting means for counting a successive number of states where a sign of the accumulated intersymbol interference component is opposite to a sign of the differential value thereof, when selecting said second phase control means;

determining means for determining whether or not the successive number is larger than a definite number; and selecting means for selecting said first phase control means after it is determined that the successive number is larger than the definite value.

6. An apparatus as set forth in claim 1, wherein said selecting means comprises:

delaying means for delaying the clock signal;

phase difference detecting means for detecting a difference in phase between the clock signal and the delayed clock signal;

determining means for determining whether or not the difference in phase is zero; and selecting means for selecting said first phase control means after it is determined that the difference in phase is zero.

7. A sampling phase controlling apparatus for controlling a phase of a clock signal supplied to a transmission system including a sign discriminating circuit for discriminating a sign of a received signal and an equalizer, connected to said sign discriminating circuit, for removing an intersymbol interference component of the received signal, comprising:

a subtracter, connected to said sign discriminating circuit, for calculating a difference between an output signal and an input signal of said sign discriminating circuit to generate a residual intersymbol interference signal;

a correlation calculating circuit, connected to said subtracter and said sign discriminating circuit, for calculating a correlation signal between the residual intersymbol interference signal and the output signal of said sign discriminating circuit;

an integrator, connected to said correlation calculating circuit, for accumulating the correlation signal to generate a first signal;

a differentiator, connected to said integrator, for calculating a differential value of the first signal to generate a second signal;

a first phase control circuit, connected to said integrator, for changing the phase of the clock signal in response to a sign of the first signal;

a second phase control circuit, connected to said integrator and said differentiator, for changing the phase of the clock signal in response to the sign of the first signal and a sign of the second signal; and a selector circuit, connected to said first and second phase control circuits, for selecting one of said first and second phase control circuits.

8. An apparatus as set forth in claim 7, wherein said first phase control circuit changes the phase of the clock signal by a first definite value in accordance the sign of the first signal, said second phase control circuit changing the phase of the clock signal by one of the first definite value and a second definite value larger than the first definite value in accordance with the signs of the first and second signals.

9. An apparatus as set forth in claim 7, wherein said first phase control circuit advances the phase of the clock signal by a first definite value when the first signal is positive and retards the phase of the clock signal by the first definite value when the first signal is negative, said second phase control circuit advancing the phase of the clock signal by a second definite value larger than the first definite value when the first and second signals are both positive, advancing the phase of the clock signal by the first definite value when the first signal is positive and the second signal is negative, retarding the phase of the clock signal by the second definite value larger than the first definite value when the first and second signals are both negative, and retarding the phase of the clock signal by the first definite value when the first signal is negative and the second signal is positive.

10. An apparatus as set forth in claim 7, wherein said selector circuit comprises:

a counter for counting a successive number of states where the sign of the first signal is opposite to that of the second signal when said second phase control circuit is selected; and a comparator, connected to said counter, for determining whether or not the successive number is larger than a definite number, thereby selecting said first phase control circuit after the successive number is larger than the definite number.

11. An apparatus as set forth in claim 7, wherein said selector circuit comprises:

a delay circuit for delaying the clock signal to generate a delayed clock signal;

a phase comparator, connected to said delay circuit, for detecting a difference in phase between the clock signal and the delayed clock signal;

a determining circuit, connected to said phase comparator, for determining whether or not the difference in phase is zero, thereby selecting said first phase control circuit after the difference in phase is zero.

* * * * *